UNITED STATES PATENT OFFICE.

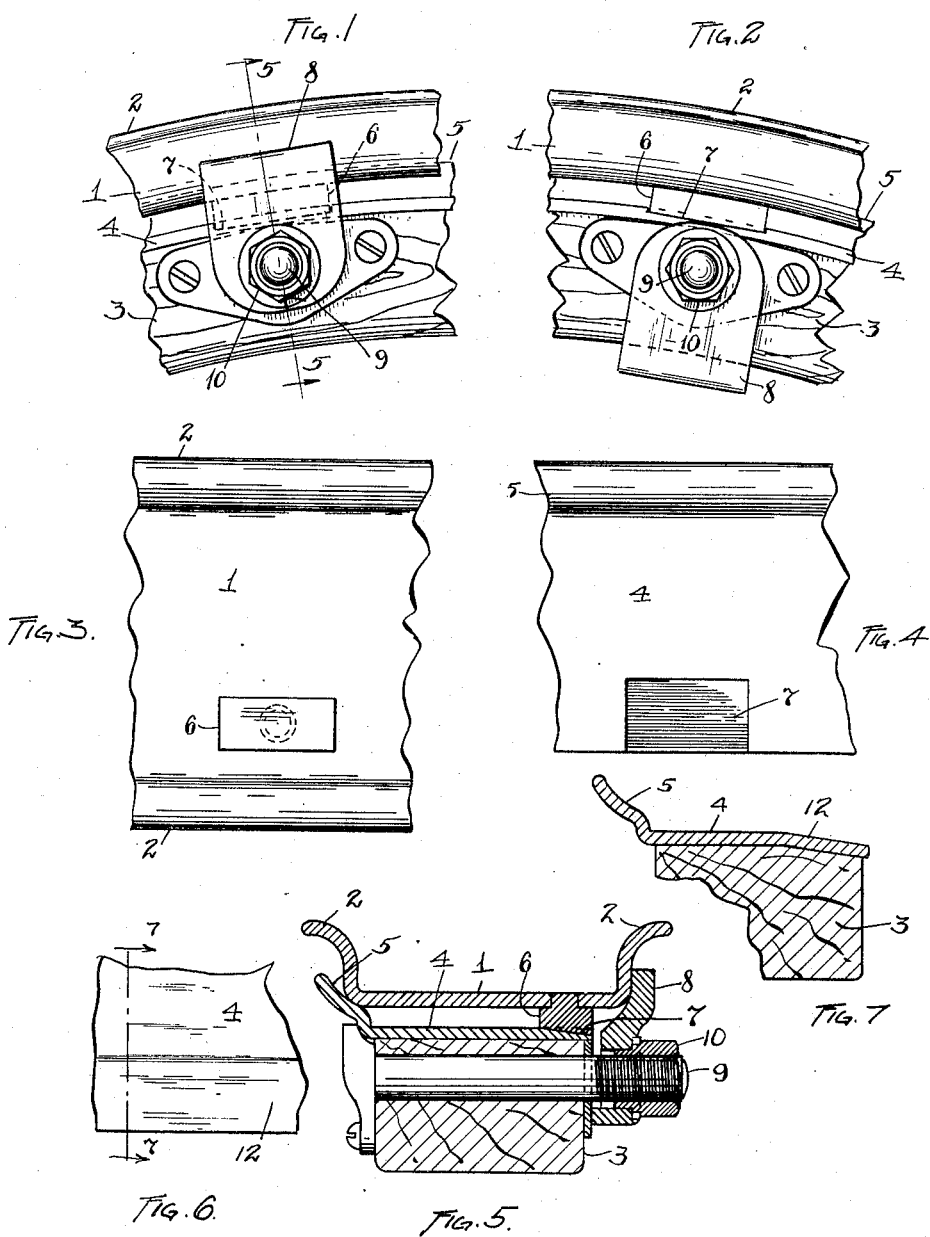

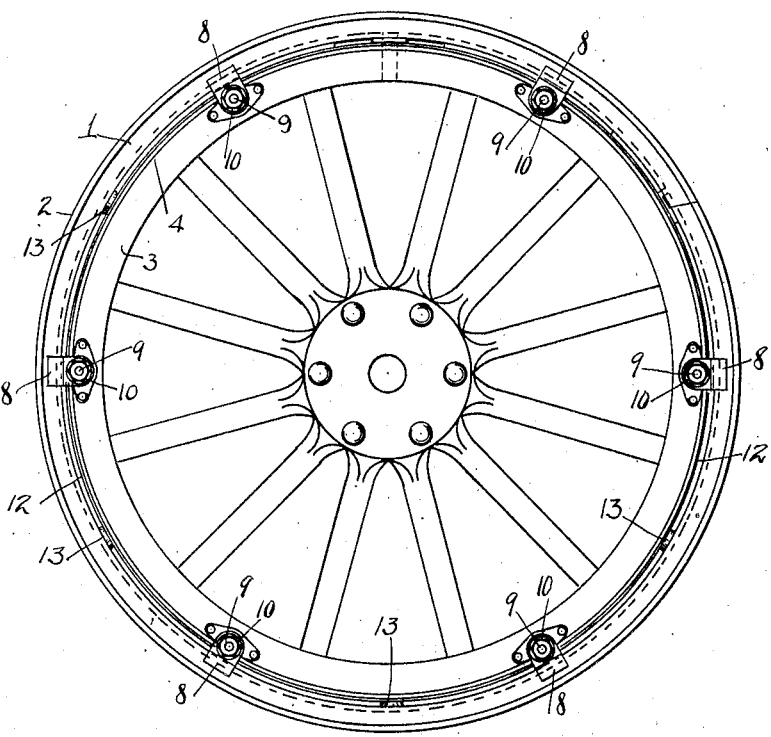

JOHN C. MANTERNACH, OF LAKEWOOD, OHIO, ASSIGNOR TO THE STANDARD PARTS COMPANY, OF CLEVELAND, OHIO, A CORPORATION OF OHIO.

VEHICLE-WHEEL WITH DEMOUNTABLE RIM.

1,379,032.  Specification of Letters Patent.  Patented May 24, 1921.

Application filed July 26, 1918. Serial No. 246,880.

*To all whom it may concern:*

Be it known that I, JOHN C. MANTERNACH, a citizen of the United States, and a resident of Lakewood, county of Cuyahoga, and State of Ohio, have invented a new and useful Improvement in Vehicle-Wheels with Demountable Rims, of which the following is a specification, the principle of the invention being herein explained and the best mode in which I have contemplated applying that principle, so as to distinguish it from other inventions.

The present improvements, relating as indicated to vehicle wheels with demountable rims, have more particular regard to the means provided for thus demountably securing such a rim in place on the wheel body. The object of the invention is to avoid entirely the use of separate wedge members requiring to be interposed between the rim and felly-band or wheel body, whatever the character of the latter, in order to lock the rim in place. In other words it is designed that the rim shall be directly wedged onto the wheel, and yet at the same time avoid the difficulties which have heretofore characterized this type of construction. One of the difficulties thus encountered in constructions of this type as heretofore designed is due to the tendency of the parts to stick together, and another arises from the fact that one side of the rim will wedge on before, or more tightly, than the other.

To the accomplishment of the object stated and other related objects, the invention, then, consists of the means hereinafter fully described and particularly pointed out in the claims.

The annexed drawings and the following description set forth in detail certain mechanism embodying the invention, such disclosed means constituting, however, but several of the various mechanical forms in which the principle of the invention may be used.

In said annexed drawings:—

Figure 1 is a side elevational view of a demountable rim of typical form, as locked in place on a typical wheel by means of my improved locking device; Fig. 2 is a view similar to Fig. 1, but showing the locking device in released position; Fig. 3 is a broken bottom plan view of a short section of the demountable rim, as modified in construction to embody the present invention; Fig. 4 is a plan view of a complementary section of the felly-band forming a part of the wheel body; Fig. 5 is a transverse section of the rim locked in seated position on the wheel, the plane of the section being indicated by the line 5—5, Fig. 1; Fig. 6 is a view similar to Fig. 4, but illustrating a modification in construction of the felly-band; Fig. 7 is a sectional view of the same detail; Fig. 8 is an elevation of a wheel and rim complete, with my improved locking means, the form of felly-band illustrated being the same as that appearing in Figs. 6 and 7; and Fig. 9 is a developed plan view of the rim appearing in said Fig. 8, and illustrates a modification therein from the form illustrated in Fig. 3.

The demountable rim 1 illustrated has side flanges 2 adapting the rim to receive and support a straight side tire, as shown, but it is evident that a rim designed for a clencher tire might be employed equally as well. The wheel-body likewise is of a conventional type, only a section of the felly 3 appearing in most of the figures of the drawings, but it being understood that the usual hub and spokes complete the structure. Such felly 3 is surrounded by the usual felly band 4, the rear edge of which is bent radially outward so as to form an inclined flange 5 with which the rear edge of the rim, when in seated position on the wheel, is designed to engage.

In this type of rim construction as heretofore utilized, a plurality of wedges are introduced in circumferentially spaced relation between the outer edge of the rim and the corresponding edge of the felly band, in order to securely lock the rim in place. Instead of such separate wedges, which require to be entirely withdrawn before the rim can be unseated and removed, and which are apt to be in the way, as well as easily to become lost, I provide a corresponding series of transversely beveled lugs 6 fixedly attached to the inner face of the rim adjacent such outer edge thereof, so as to form in effect an integral part of the rim. As shown these lugs consist of blocks riveted fast in much the same fashion as the so-called space lugs, in current use on rims of this type, are attached to the rim.

At the points about the edge of the felly-band where these several lugs would contact with the same, such felly-band in the form of my construction illustrated in Figs. 1, 2, 4 and 5 is provided with beveled recesses, or notches 7, with the bottoms of which the inclined faces of such lugs engage so as to force the rim radially outward, incidentally to movement of the latter transversely of the felly. Such movement of the rim may be conveniently effected by means of clamps 8 of the form illustrated in Figs. 1, 2 and 5, that are longitudinally as well as rotatably movable on the ends of transversely disposed bolts 9 projecting from the side of the felly. Nuts 10 on these bolts operate to force the clamps inwardly or, upon rotation in the opposite direction release such clamps and permit the same to be turned out of engagement with the side of the rim as shown in Fig. 2. In this latter position of the clamps the rim is free to be laterally removed from the wheel body, as will be readily understood.

By the foregoing construction, I am enabled to secure a continuous circumferential engagement between the rear edge of the rim and the felly-band or wheel body, just as in the present demountable style type of rim, while the wedge lugs 6 on the outer edge of such rim may be spaced sufficiently close together to provide as much or more support than is provided by the separate wedges used with the type just referred to. Owing to the spaced relationship, however, of these lugs, and the fact that the rim where constructed properly has a certain degree of flexibility, they will ride up the inclines in the respective notches 7 until the rear edge of the rim is firmly seated or wedged on the flange 5, the arcs of the rim between adjacent projections being to that extent, although of course very slightly, distorted or flattened.

It will of course be understood that side clamps 8 need not be disposed necessarily adjacent the projections nor need the number of such clamps be as great as the number of such projections. Moreover, instead of providing a series of separate notches or recesses 7 having inclined bottoms, the corresponding portion of the felly-band may be initially rolled down so as to present a beveled face 12 for the entire circumference of the band as shown in Figs. 6 and 7. This may be by some considered as a simpler form of construction from the standpoint of manufacture, and is the form illustrated in Fig. 8, where the complete rim is shown in side elevation upon the wheel-body. In this figure, as well as in Fig. 9, is also shown a modification in the construction of the rim consisting in the placing of a series of supporting lugs 13 with flat contacting faces, intermediate between the beveled lugs 6. Said supporting lugs 13 are so located as to overlie the flat, i. e., cylindrical surface of the felly band either between the recesses 7 if the first-described band be used, or else inside the inner line of the continuous bevel 12 in case the second form be employed.

These lugs 13 will normally be spaced slightly from the felly band, but upon the rim being wedged home, owing to the flattening of the arcs between the beveled lugs 6, as already described, said lugs 13 will be brought down into more or less forceful contact with the felly band. Aside from the additional support in the radial load-taking direction thus afforded the rim, these lugs 13, I find, assist materially in relieving the clamps 8 of side strains, such as are produced when the vehicle is turning, or skids. In other words, while the tendency of the rim without these lugs 13 would be to slide down the inclined flange 5 and the similarly inclined recesses 7, or beveled face 12, and so to press with considerable force against said clamps 8, I find the frictional engagement of the lugs 13 with the flat surface of the felly band resists this tendency and correspondingly relieves the side-clamping means of undue lateral pressure.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a wheel body having similarly inclined, transversely beveled surfaces adjacent its respective edges; of a demountable rim adapted to be directly wedged onto said wheel body, said rim being formed to engage one such beveled surface substantially around its entire circumference and to engage the other such surface at circumferentially spaced points only; and surfaces on said wheel body and rim adapted to be brought into inter-engagement by the flattening of the arcs of said rim between such points, substantially as and for the purpose described.

2. The combination with a wheel body having similarly inclined, transversely beveled surfaces adjacent its respective edges; of a demountable rim adapted to be directly wedged onto said wheel body, said rim having complementary beveled surfaces adjacent its respective edges, one such surface on said rim extending substantially around its entire circumference, and the other such surface on said rim being discontinuous so as to engage the corresponding surface on said wheel body at circumferentially spaced points only; and surfaces on said wheel body and rim adapted to be brought into inter-engagement by the flattening of the arcs of said rim between such points, substantially as and for the purpose described.

3. The combination with a wheel body having a transversely beveled, outwardly inclined flange adjacent its rear edge and a similarly inclined beveled surface adjacent its front edge; of a demountable rim adapted to be directly wedged onto said wheel body, said rim having its rear edge formed to engage such flange substantially around its entire circumference and having a series of circumferentially spaced transversely beveled lugs adjacent its front edge adapted to engage the beveled edge adjacent the front edge of said wheel body; and a second series of spaced lugs on said rim intermediate of said beveled lugs adapted to be brought into contact with the cylindrical surface of said wheel body by the flattening of the arcs of said rim between such points, substantially as and for the purpose described.

Signed by me, this 22 day of July, 1918.

JOHN C. MANTERNACH.